United States Patent [19]

Stein

[11] 3,829,551

[45] Aug. 13, 1974

[54] ATMOSPHERE PURIFICATION OF XENON, RADON & RADON DAUGHTER ELEMENTS

[75] Inventor: Lawrence Stein, Downers Grove, Ill.

[73] Assignee: The United States of America as represented by the United States Atomic Energy Commission, Washington, D.C.

[22] Filed: Mar. 27, 1973

[21] Appl. No.: 345,419

[52] U.S. Cl............ 423/210, 423/249, 423/262, 423/472, 176/37, 252/301.1 R
[51] Int. Cl............................................. B01d 53/34
[58] Field of Search........... 423/210, 262, 472, 249; 176/37; 252/301.1 R, 301.1 W

[56] References Cited
UNITED STATES PATENTS 3,185,548    5/1965    Fields et al. .................... 423/262
3,377,136    4/1968    Morrow ............................ 423/262
3,778,499    12/1973   Stein ................................. 423/210
3,784,674    1/1974    Stein ............................. 423/210 X Primary Examiner—Earl C. Thomas
Attorney, Agent, or Firm—John A. Horan; Arthur A. Churm; James W. Weinberger

[57] ABSTRACT

A method of purifying an atmosphere of xenon, radon and radon daughter elements by passing the atmosphere containing these elements through a reaction bed of dioxygenyl hexafluoroantimonate, which oxidizes the xenon, radon and radon daughter elements to their respective fluorides which remain in the reaction bed and are thus removed from the atmosphere, and recirculating the purified atmosphere. The method is also useful for separating the before-named elements from krypton.

9 Claims, No Drawings

ATMOSPHERE PURIFICATION OF XENON, RADON & RADON DAUGHTER ELEMENTS

CONTRACTUAL ORIGIN OF THE INVENTION

The invention described herein was made in the course of, or under, a contract with the UNITED STATES ATOMIC ENERGY COMMISSION.

BACKGROUND OF THE INVENTION

This invention relates to a method for purifying an atmosphere of xenon, radon and radon daughter elements which may be contained therein and for the separation of these elements from krypton.

Radon is a heavy, radioactive, gaseous element formed by the alpha disintegration of radium. The most common isotope, $^{222}$Rn, is an alpha emitter with a half-life of 3.8 days. Radon is inherently associated with radium in uranium ores and, with its short-lived radioactive daughters, $^{218}$Po, $^{214}$Pb, $^{214}$Bi, and $^{214}$Po, constitutes a potential health hazard in uranium mining and ore-handling operations. The daughter elements are solids and tend to be retained in the lungs, where they may ultimately cause cancer.

Forced ventilation is generally used to lower concentrations of the radioactive elements in the atmosphere of a uranium mine, but it is often difficult to lower the concentrations adequately in all parts of a mine by this method, since the gaseous radon diffuses continuously from exposed veins of uranium ore and from piles of the broken ore.

Several methods have been developed for the removal of radon and its daughter elements from the atmosphere by contacting the atmosphere with various chemicals capable of reacting with the elements to remove them from the atmosphere.

One of these methods uses a fluorinating solution to oxidize the radon and daughter elements to fluoride compounds which then dissolve in the solution. However, liquid fluorinating solutions pose several problems. The liquids are highly corrosive and, in some instances, have high vapor pressures. Corrosionresistant equipment is therefore required for contacting large volumes of air with the liquid phase. Additional equipment is also necessary to further purify the atmosphere (i.e., to remove any hazardous vapors picked up from the fluorinating solution) before the atmosphere is recirculated. In another method, the atmosphere containing the radon and radon daughter elements is passed through a solid reaction bed of a fluorinating compound, as disclosed in applicant's copending application Ser. No. 179,229 (70), filed Sept. 9, 1971. In this method, the elements are oxidized by the fluorinating compound to their respective fluorides and remain in the reaction bed; they are thus removed from the atmosphere, which may then be recirculated. The fluorinating compounds disclosed therein are complex fluorides formed by reaction of halogen fluorides and metal fluorides such as $ClF_2SbF_6$, $BrF_2SbF_6$, $BrF_4SbF_{11}$, $IF_4\,SbF_6$, and $Br_2BiF_6$. One problem with the use of the solid reaction compounds is that they release halogen fluoride vapors as reduction products in their reactions with radon. These must be removed from the radon-free atmosphere before it can be recirculated. This removal requires additional equipment and adds to the over-all cost of radon and radon daughter element removal from the atmosphere.

Radioactive noble gases are also found in the atmospheres of nuclear reactor power facilities and nuclear reactor fuel reprocessing facilities. These gases generally consist of a number of isotopes of krypton and xenon and range in half-life from seconds to years. Many of the krypton and xenon isotopes which have short half-lives have radioactive daughter elements having relatively long half-lives. In a boiling water reactor, the fission gases which have entered the water in the reactor, either by diffusion through the fuel cladding or through breaks in the cladding, are released at the exit of the turbine condenser. These gases are normally discharged to the atmosphere after a short delay time. In the pressurized water reactor, the gases are removed in the coolant loop and are stored for periods up to months to eliminate the short-lived gases by radioactive decay. In each case, the quantity of fission gas eventually released to the atmosphere depends upon the condition of the reactor fuel, and emissions could be increased greatly in the event of an accident such as a fuel meltdown. Emissions from liquid-metal-cooled reactors, breeder reactors, and high-temperature-gas-cooled reactors will arise from the same general source but will vary as to nature and quantity from those emanating from light-water reactors.

Industrial sources of non-fission-product krypton and xenon are liquid-air plants. Air contains only 1.14 ppm krypton and 0.087 ppm xenon. The cost of obtaining noble gases from liquidair plants is therefore high and the supply, particularly of xenon, is limited. Various methods have been developed for the treatment of these gaseous reactor wastes and the recovery of the fission product noble gases. Fixed adsorption beds have been used in a number of applications for the removal of radioactive noble gases from dilute gas streams at room temperature. These adsorption beds may be either charcoal or molecular sieve. The advantages of the room temperature adsorption process are that it is simple to operate and will accept very dilute feed material. Disadvantages are the large volume of adsorbent required and the potential fire hazard with charcoal. A low-temperature charcoal process can also be used for noble gas recovery. It has the disadvantages of high operating cost, requires pretreatment of the inlet gas to beds, and also requires extensive liquid nitrogen production capabilities and a steady flow and constant composition of incoming feed gas. Low-temperature adsorption beds are similar to room-temperature beds but are much smaller in size, since the noble gas capacity of adsorbents increases markedly as the bed temperature approaches liquid nitrogen temperature. Halocarbon solvents such as Freon have also been used for selective adsorption of krypton and xenon. This method utilizes the high solubility of krypton and xenon in the solvent. In a continuous adsorption process, krypton and xenon are preferentially removed from an incoming gas stream by selective dissolution in a Freon solvent at relatively low temperature and high pressure.

The recovery of xenon and krypton by treating gaseous radioactive wastes with fluorine is described in an article entitled "Recovery of Xenon and Krypton in the Treatment of Gaseous Radioactive Wastes" by J. Slivnik, *Proceedings of Symposium on Treatment of Airborne Radioactive Wastes*, Int. At. Energ. Agency, Vienna, 1968, pp. 315–321. In this study, an attempt was made to react xenon and krypton with fluorine at high pressures and elevated temperatures. It was found that, while the xenon would react with the fluorine, krypton would not, which permitted the separation of xenon from the krypton. However, fluorine is not a convenient reagent for this purpose, as it must be heated with the process gas and the excess fluorine must be removed afterwards.

SUMMARY OF THE INVENTION

I have found a method for purifying an atmosphere of xenon, radon and radon daughter elements by passing the atmosphere containing these elements through a reaction bed of $O_2SbF_6$, whereby the xenon, radon and radon daughter elements are oxidized to their respective fluorides, which remain on the bed and are thereby separated from the atmosphere, and recirculating the purified atmosphere.

The method of this invention is also useful for the separation of xenon from krypton by passing an atmosphere containing these elements through a reaction bed of $O_2SbF_6$, whereby the xenon is oxidized to $XeFSb_2F_{11}$ and remains on the reaction bed while the krypton passes through the bed.

A distinct advantage in the use of the method of this invention over the prior art methods for purification of the atmosphere is that the compound of this invention has a sufficiently low vapor pressure that further purification of the atmosphere is not necessary before it can be recirculated. In addition, the reaction of the noble gas with the compound results in the release of oxygen rather than halogen fluoride, thus again eliminating the necessity for additional atmospheric purification prior to its being recirculated.

It is one object of this invention to provide an improved method for purifying an atmosphere of radon and radon daughter elements.

It is still another object of this invention to provide a method for purifying an atmosphere of xenon, radon and radon daughter elements.

It is a further object of this invention to provide an improved method of purifying an atmosphere of xenon, radon and radon daughter elements by passing the atmosphere through a reaction bed of a material having a low vapor pressure, thereby eliminating the necessity for additional atmospheric purification.

It is still another object of this invention to provide a method of purifying an atmosphere of xenon, radon and radon daughter elements whereby the reaction product of these elements with the oxidizer is oxygen.

Finally, it is the object of this invention to provide a method of separating xenon and krypton.

DESCRIPTION OF THE PREFERRED EMBODIMENT

These and other objects of the invention may be met by passing an atmosphere containing xenon, radon, radon daughter elements and krypton through a reaction bed of dioxygenyl hexafluoroantimonate ($O_2SbF_6$), whereby the xenon, radon, and radon daughter elements react with the $O_2SbF_6$ to form nonvolatile fluorine compounds which remain on the reaction bed, while the krypton passes through the bed, and recirculating the atmosphere purified of xenon, radon and radon daughter elements.

Preparation of dioxygenyl hexafluoroantimonate ($O_2SbF_6$) is described in detail in "Photochemical Synthesis of Dioxygenyl Salts," Shamir and Binenboym, *Inorganica Chimica Acta*, 2, 37, March 1968. The product obtained by photochemical reaction of oxygen, fluorine and antimony pentafluoride is a white, crystalline powder.

The method of this invention is operable at temperatures from about 0°C. to about 125°C., above which temperature $O_2SbF_6$ begins to decompose. At these temperatures, the xenon, radon and radon daughter elements will react immediately with the hexafluoroantimonate compound. No reaction of krypton at 485 to 700 mm pressure was observed from 23° to 150°C.

In the method of this invention, the atmosphere to be purified is passed through a reaction bed of $O_2SbF_6$ in powder form, so that any xenon, radon and radon daughter elements in the atmosphere will contact the bed and will be oxidized thereby to their respective fluorine compounds which will remain on the bed and thus be removed from the atmosphere. If it is desired to separate the xenon from krypton, the atmosphere containing these elements is passed through the bed, whereby the xenon will be oxidized to its respective fluorine compound and remain on the bed and the atmosphere containing the krypton, now purified of xenon, will pass through the bed.

The oxidized xenon and radon can be readily recovered from the reaction bed and separated from the radon daughter elements by hydrolyzing the reaction bed containing the noble gas compounds. The reaction bed will thus be reduced and dissolved, as will the radon daughter element fluorides, while the xenon and radon will be released as gases and may be easily collected.

If the atmosphere from which the xenon, radon and radon daughter elements are to be removed contains any moisture, it will be necessary to dry the atmosphere before it is contacted with the reaction bed, since water vapor will decompose the dioxygenyl hexafluoroantimonate and release the radioactive noble gases. This drying step may be accomplished by passing the humid atmosphere through a desiccant such as anhydrous calcium sulfate, magnesium perchlorate or silica gel, or by passing the air through refrigeration coils to remove the water by condensation.

Raman spectral studies have shown that the xenon product is $XeF^+Sb_2F_{11}^-$, a 1:2 xenon difluoride - antimony pentafluoride complex. When xenon is added gradually to $O_2SbF_6$, a new band (characteristic of the xenon-fluorine stretching vibration of $XeF^+$ cation) appears in the spectrum at 618 cm$^{-1}$. Shifts in the $SbF_6^-$ vibration frequencies also occur. The final spectrum contains prominent bands at 618, 655, and 686 cm$^{-1}$.

Mass spectrometric analyses of residual gases in experiments with krypton-xenon mixtures have shown that two molecules of oxygen are released for each atom of xenon absorbed as follows:

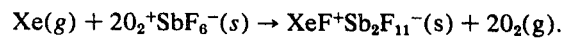

$Xe(g) + 2O_2^+SbF_6^-(s) \rightarrow XeF^+Sb_2F_{11}^-(s) + 2O_2(g)$.

No spectral or analytical date have been obtained for the trace amounts of radon product (no stable isotopes of radon are known, and the $^{222}$Rn product is intensely radioactive), but radon probably forms an analogous 1:2 radon difluoride - antimony pentafluoride complex as follows:

$$Rn(bg) + 2O_2^+SbF_6^-(s) \rightarrow RnF^+Sb_2F_{11}^-(s) + 2O_2(g).$$

The following examples are given as illustrative of the invention and are not to be taken as limiting the scope of the invention as defined by the claims.

EXAMPLE I

Flow experiments were carried out with $O_2SbF_6$ powder and samples of air (0.33–0.76 $l$ at standard temperature and pressure) which had been artificially contaminated with $^{222}$Rn and $^{133}$Xe. In each experiment, a radon-air mixture or a xenon-air mixture was passed through a glass U-tube packed with the powder, then through a trap cooled with liquid nitrogen to condense any unreacted radioisotope. The distribution of the radioisotope was afterwards determined by measuring the γ-emission of the U-tube and the cold trap. (The distribution of $^{133}$Xe was determined immediately; the distribution of $^{222}$Rn was determined after 3 hours, when $^{222}$Rn and its γ-emitting daughters $^{214}$Pb and $^{214}$Bi were known to be in radioactive equilibrium.) In three experiments with the radon isotope and with a bed of powder 5.0 cm long and 6.3 mm in diameter, all of the radon was absorbed. In five experiments with the xenon isotope and with a bed of powder 6.5 cm long and 5.5 mm in diameter, 67–100 percent of the xenon was absorbed. The results are given in the table below.

REMOVAL OF RADON AND XENON FROM AIR WITH $O_2SbF_6$ AT 23–25°

| Radio-Isotope | Conc. in Air (mci/l) | Average Flow Rate (ml/min) | Amount of Radioisotope Removed (%) |
| --- | --- | --- | --- |
| $^{222}$Rn | 13 | 12 | 100 |
| do. | 15 | 15 | 100 |
| do | 24 | 12 | 100 |
| $^{133}$Xe | 9.8 | 15 | 67* |
| do. | 7.9 | 13 | 100 |
| do | 2.0 | 14 | 100 |
| do | 3.2 | 13 | 98 |
| do | 4.3 | 14 | 100 |

*Flow rate poorly controlled at start of experiment.

EXAMPLE II

Equimolar mixtures of krypton and xenon were partly separated on transit through U-tubes packed with $O_2SbF_6$. The mixtures were passed through beds of the compound 5.8–6.0 cm long and 5.5 mm in diameter at 23°–25° and at total pressures of 20–160 mm. Gases emerging from the beds were collected and analyzed mass spectrometrically. The first samples had the following range of composition: 45.5–49.6 percent $O_2$, 12.7–16.2 percent Xe, and 37.7–38.3 percent Kr. The percentages of oxygen fell and the percentages of krypton and xenon rose in succeeding gas samples as the $O_2SbF_6$ was depleted. (The color change of the powder, from white to yellow, could be used to indicate the amount depleted, as there was a sharp interface between colored zones.) Each time that gas was admitted, a blue-green fluorescence was noted in the $O_2SbF_6$. The source of this emission is not known at present, but it is probable that an excited xenon, oxygen, or ozone species is formed in the reaction.

EXAMPLE III

More complete separation of krypton and xenon was achieved by shaking equimolar mixtures of the gases with $O_2SbF_6$ powder in Pyrex bulbs containing stirring vanes. The mixtures were shaken intermittently, by hand, at room temperature with excess amounts of the powder over periods of 3–24 hours. Residual gases were then analyzed mass spectrometrically. The final gas mixtures were found to contain less than 2 percent xenon.

It can be seen that the method of the invention is highly effective for the removal of xenon, radon and radon daughter elements from an atmosphere contaminated with these radioactive noble gases and for the separation of these gases from krypton.

It is to be understood that the invention is not to be limited by the details given herein but that it may be modified within the scope of the appended claims.

The embodiments of the invention in which an exclusive property or privilege is claimed are defined as follows:

1. A method for purifying an atmosphere of xenon, radon and radon daughter elements comprising: passing the atmosphere containing the xenon, radon and radon daughter elements through a reaction bed of $O_2SbF_6$ whereby the xenon, radon and radon daughter elements are oxidized to their respective fluorides which remain on the bed and are thereby separated from the atmosphere, and recirculating the purified atmosphere.

2. The method of claim 1 wherein the temperature is from 0° to about 125°C.

3. The method of claim 2 comprising the additional step of drying the atmosphere containing the xenon, radon and radon daughter elements before passing the atmosphere through the reaction bed.

4. A method of separating xenon from krypton comprising: passing an atmosphere containing xenon and krypton through a reaction bed of $O_2SbF_6$ whereby the xenon is oxidized to $XeFSb_2F_{11}$ and remains on the bed while the krypton passes through the bed, contacting the bed with water, thereby hydrolyzing the bed and releasing the xenon and collecting the xenon.

5. The method of claim 4 wherein the temperature is from 0° to about 125°C.

6. The method of claim 5 comprising the additional step of drying the atmosphere containing the xenon and krypton before passing the atmosphere through the reaction bed.

7. In the method of purifying an atmosphere of radon and radon daughter elements by passing the atmosphere containing said elements through a reaction bed of a fluorinating compound whereby the radon and radon daughter elements are oxidized to their respective fluorides and remain on the bed and are thereby separated from the atmosphere, and recirculating the purified atmosphere, the improvement wherein the fluorinating compound has the formula $O_2SbF_6$.

8. The method of claim 7 wherein the temperature is from 0° to about 125°C.

9. The method of claim 8 comprising the additional step of drying the atmosphere containing the radon and radon daughter elements before passing the atmosphere through the reaction bed.

* * * * *